June 23, 1931.  H. W. TURNER  1,811,767
WINDSHIELD HEATER
Filed Feb. 24, 1930
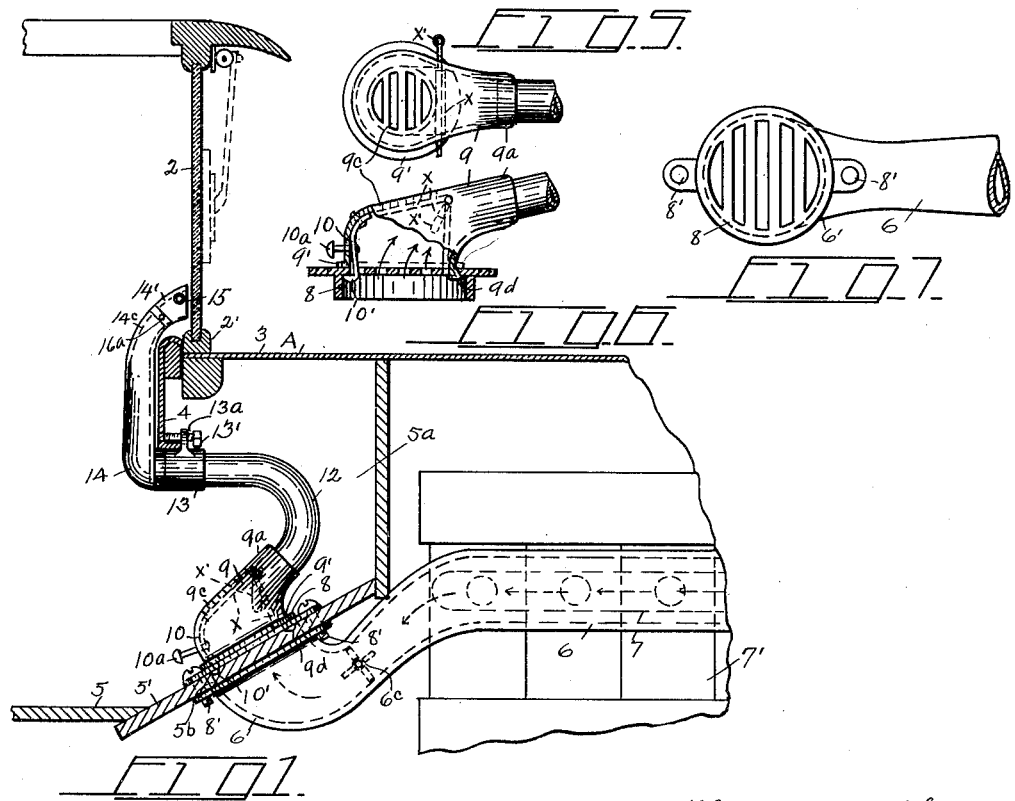
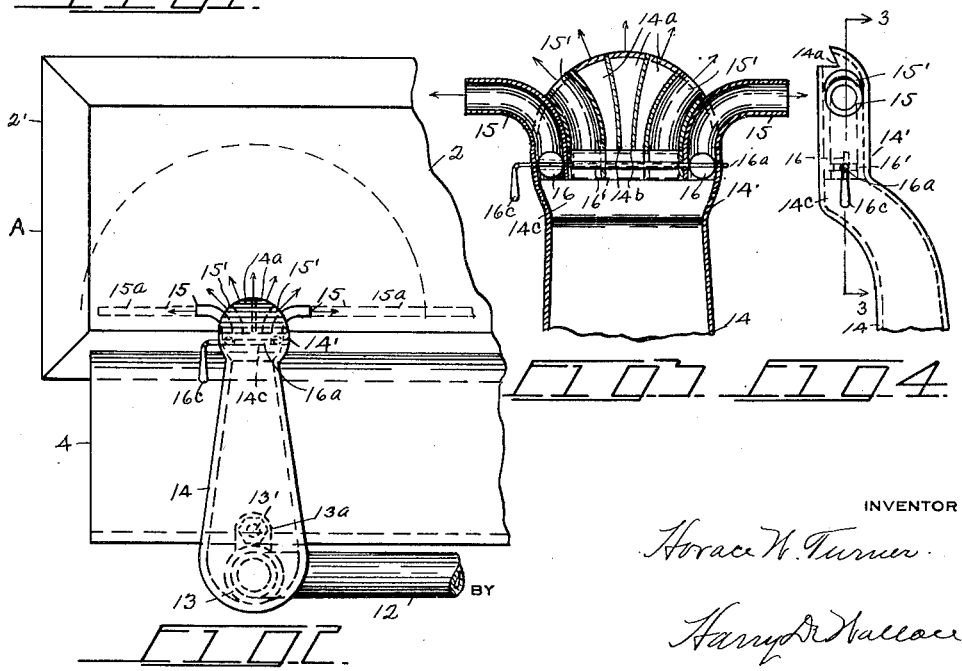
INVENTOR,
Horace W. Turner
BY
Harry D. Wallace
ATTORNEY.

Patented June 23, 1931

1,811,767

UNITED STATES PATENT OFFICE

HORACE W. TURNER, OF PHOENIX, NEW YORK

WINDSHIELD HEATER

Application filed February 24, 1930. Serial No. 430,726.

This invention relates to improved means for heating and preventing condensation and accumulation of frost or moisture upon either the inner or outer surfaces of the windshields of automobiles, airplanes, and the like, and incidentally to melt, or at least soften and loosen ice and snow, to such extent that the ordinary windshield wiper may effectually clean the portion of the windshield directly in front of the driver's position.

To this end, the object of my invention is to utilize heat derived from any of the well-known vehicle warming systems, which are usually supplied with blasts of air produced by the engine fans and passed through a heater body mounted upon or adjacent the exhaust manifolds. A further object is to provide novel construction and arrangement of the windshield, or auxiliary heater, which includes a simple converter that may be readily and quickly attached to one of the floor registers of the heating system, and by means of which all or part of the products of the heating system may be diverted toward the windshield, by a simple control disposed within reach of the driver. And a further object is to provide a nozzle of peculiar construction, which may be supported adjacent the windshield by the usual instrument board, and which is provided with a series of dampers by which the distribution of the heat may be restricted to the local area usually traversed by the automatic windshield wipers, or may be distributed over substantially the whole length and height of the windshield.

The various features and parts of the invention will be understood from the detailed description which follows, and by reference to the accompanying drawings, in which—

Figure 1 is a broken vertical longitudnal section of an automobile to which my improvement is applied. Fig. 2 is a broken inside elevation of the windshield and instrument board, showing my heat distributing nozzle supported by said board. Fig. 3 is an enlarged broken vertical section, taken on line 3—3 of Fig. 4, showing the arrangement of the discharge end of the nozzle by which the heat waves are directed radially towards different parts of the windshield. Fig. 4 is a side edge elevation of the nozzle. Figs. 5 and 6 are respectively a top plan and a side elevation of the fitting by which the heat derived from the said heater register may be wholly or partially diverted to either the windshield or to the interior of the vehicle. And Fig. 7 is a top plan view of the floor register of the vehicle heater that supports the converter.

In the drawings, A represents generally an automobile, having a windshield 2, enclosed by a frame 2', that rests upon a cowl 3, which may also support the usual instrument board as 4, below the bottom plane of the windshield. 5 is the floor of the automobile which has an inclined foot rest 5' and together with the cowl forms a forwardly extending recess 5a. 6 represents conventionally the hollow body of one type of automobile heater, which is shown mounted upon the exhaust manifold 7, of the engine 7', and may be supplied with blasts of air from the usual engine fan (not shown), and the temperature of the air passing through the body 6 in the direction of the arrows in Fig. 1 is raised by heat radiated by the manifold. The end 6' of the heater is disposed beneath and coincides with an opening 5b in the floor 5', the said opening being closed by a grate-like register 8, which ordinarily dispenses the products of the heater 6 for warming the car A. The register 8 and the corresponding end of the heater may be secured to the floor 5' by bolts 8'. The grate 8, according to the present showing, is normally open for the unrestricted flow of the heated air into a novel converter comprising a hollow body 9 that rises from a plane base 9', said body being formed with a lateral upwardly inclining neck 9a, by which the products of the member 6 may be diverted for heating the windshield. The top of the converter 9 is formed with a grating 9c, which in the present case, performs the usual functions of the grate 8 during the heating of the car. The conversion of the hot air for heating the car or for heating the windshield is controlled by a common damper x, which is operable by a handle x', to close either the grate 9c or the passage through the neck 9a, as shown in Fig. 6. The converter 9 is preferably detachably secured to the register 8 by means of a tooth 9d, that extends below the plane of the base 9' and may be inserted through one of the grate openings 8', and a spring latch 10, which is secured to the opposite or front wall of the body 9, as shown in Figs. 1 and 6. The lower end of the latch 10 comprises a similar tooth that may also be inserted through an adjacent opening 8' to inter-lock the converter to the grate 8. The latch 10 is fitted with a push pin 10a that extends through an opening in the body 9, and when forced inwardly by pressure of one's hand, releases the tooth 10' and enables the body 9 to be instantly removed, as may be understood by consulting Figs. 1 and 6. The converter 9, which forms an essentially novel part of my improved windshield heater, discharges the hot air into the lower end of a flexible pipe 12, whose upper end is suitably connected to a sleeve coupling 13, which may be detachably secured to the lower edge of the instrument board 4, by means of a bolt 13' that passes through a perforated lug 13a of the coupling and screws into said board. The coupling 13 supports, and discharges the hot air into, an upright hollow member 14, whose top end comprises a novel nozzle structure 14', which is arranged to spray the hot fluid over the inner surface of the windshield 2 (see Figs. 1 and 2). The nozzle head 14', as best seen in Figs. 3 and 4, is fitted with tubes 15, that curve laterally in opposite directions to spray portions of the hot air in the direction of the length of the windshield, and with shorter tubes 15', that direct the hot air upwardly at angles indicated by the arrows in Figs. 2 and 3. The tubes 15' are spaced to provide a central passage 14a, which is sub-divided vertically by partitions 14b, that direct the remaining portion of hot air radially, as shown. The lower ends of the tubes 15—15' as well as the passage 14a, communicate freely with a common chamber 14c, in which is disposed a series of dampers, as 16—16', all of which are mounted upon a common shaft 16a which is operable by a handle 16c. In the preferred arrangement, the dampers 16, which control the flow of the heated air through tubes 15 are disposed at right angles to the plane of the elongated damper 16', which controls the flow of the hot air through tubes 15' and passage 14a. By this arrangement, the dampers may alternately divert the hot air to the different passages, as may be understood by consulting Fig. 3. The dampers 16—16', however, may be arranged to open and close all of said outlets in unison, if desired. The tubes 15 may be extended, as shown at 15a in Fig. 2, in order to distribute the hot air to the whole area of the windshield, to eliminate steam or the accumulation of moisture due to condensation. The heater member 6 may be equipped with a damper 6c, to control the flow of the heated air therethrough, as shown in Fig. 2. The windshield heater may be readily and quickly applied and removed by simply manipulating the latch 10 and bolt B'.

Having thus described my invention, what I claim, is—

1. A device for distributing fluid against the windshield of an automobile or the like composed of a tubular head having a vertical axis and a substantially semi-circular end, a pair of spaced curved tubes at the sides of the head having inner ends within the head and having outer ends which project without the head and are horizontally disposed for directing fluid horizontally in opposite directions along the windshield, a second pair of tubes disposed between the first named tubes and arranged in spaced relation and having discharge outlets which terminate flush with the semi-circular end of the head and are disposed above the discharge outlets of the first named tubes, a series of spaced partitions forming passages in the space between the second named tubes and having vertical outlets for directing air substantially vertically at points between the second named tubes, a common chamber communicating with each of the inner ends of the tubes and the inner ends of the passages, a common shaft extending through the common passage, and dampers on the shaft for each of the tubes and passages, the dampers having a relative angular relation so as to alternately divert the fluid from the common chamber into the respective tubes and passages.

2. A device for distributing fluid against the windshield of an automobile or the like composed of a tubular head having a plurality of members therein forming independent passages for distributing fluid outwardly of the head, a common chamber communicating with each of the inner ends of the passages, a common shaft extending through the common passage, and independent dampers on the shaft for each of the passages, the dampers having a relative angular relation so as to alternately divert the fluid from the common chamber into the respective passages.

In testimony whereof I affix my signature.

HORACE W. TURNER.